United States Patent
Cao et al.

(10) Patent No.: US 11,030,411 B2
(45) Date of Patent: Jun. 8, 2021

(54) METHODS, APPARATUSES, AND DEVICES FOR GENERATING WORD VECTORS

(71) Applicant: ALIBABA GROUP HOLDING LIMITED, George Town (KY)

(72) Inventors: Shaosheng Cao, Hangzhou (CN); Jun Zhou, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/883,184

(22) Filed: May 26, 2020

(65) Prior Publication Data

US 2020/0285811 A1   Sep. 10, 2020

Related U.S. Application Data

(63) Continuation of application No. PCT/CN2019/073005, filed on Jan. 24, 2019.

(30) Foreign Application Priority Data

Feb. 5, 2018 (CN) .......................... 2018 1 0111369

(51) Int. Cl.
   *G06F 40/295* (2020.01)
   *G06N 3/04* (2006.01)
   *G06N 3/08* (2006.01)

(52) U.S. Cl.
   CPC ............ *G06F 40/295* (2020.01); *G06N 3/04* (2013.01); *G06N 3/08* (2013.01)

(58) Field of Classification Search
   CPC ........... G06F 40/295; G06N 3/04; G06N 3/08
   See application file for complete search history.

(56) References Cited

U.S. PATENT DOCUMENTS

| | | | |
|---|---|---|---|
| 6,622,134 B1 * | 9/2003 | Sorkin | G06F 21/56 706/20 |
| 10,170,104 B2 * | 1/2019 | Zhao et al. | G10L 15/063 704/1 |
| 2018/0329886 A1 * | 11/2018 | Li | G06N 3/0454 |

FOREIGN PATENT DOCUMENTS

| | | |
|---|---|---|
| CN | 104834747 A | 8/2015 |
| CN | 105760507 A | 7/2016 |
| CN | 106569998 A | 4/2017 |

(Continued)

OTHER PUBLICATIONS

MfeCNN: Mixture Feature Embedding Convolutional Neural Network for Data Mapping Dingcheng Li, Ming Huang, Xiaodi Li, Yaoping Ruan, and Lixia Yao. IEEE Transactions on Nanobioscience, Vol. 17, No. 3, Jul. 2018 165.*

(Continued)

*Primary Examiner* — Mohammad K Islam
(74) *Attorney, Agent, or Firm* — Seed IP Law Group LLP

(57) ABSTRACT

Implementations of the present specification disclose a method for generating word vectors, apparatus, and device. The method includes: obtaining words by segmenting a corpus; establishing a feature vector of each obtained word based on n-ary characters; training a convolutional neural network based on the feature vectors of the obtained words and the feature vectors of context words associated with each obtained word in the corpus; and generating a word vector for each obtained word based on the feature vector of the obtained word and the trained convolutional neural network.

22 Claims, 4 Drawing Sheets

(56) References Cited

FOREIGN PATENT DOCUMENTS

CN 107656990 A 2/2018

OTHER PUBLICATIONS

Fonduer: Knowledge Base Construction from Richly Formatted Data, Sen Wu Stanford University senwu@cs.stanford.edu Luke Hsiao; SIGMOD'18, Jun. 10-15, 2018, Houston, TX, USA.*

An input information enhanced model for relation extraction Ming Lei1 • Heyan Huang1 • Chong Feng1 • Yang Gao1 • Chao Su1; Received: Mar. 7, 2019 / Accepted: Aug. 7, 2019 / Published online: Aug. 29, 2019 Springer-Verlag London Ltd., part of Springer Nature 2019.*

International Search Report issued in Application No. PCT/CN2019/073005, dated Apr. 26, 2019, 4 pages.

Shaosheng Cao et al., "Improving Word Embeddings with Convolutional Feature Learning and Subword Information," Thirty-First AAAI Conference on Artificial Intelligence, 2017.

* cited by examiner

METHODS, APPARATUSES, AND DEVICES FOR GENERATING WORD VECTORS

CROSS-REFERENCE TO RELATED APPLICATIONS

This patent application is a continuation of PCT Application No. PCT/CN2019/073005, filed Jan. 24, 2019, which claims priority to Chinese Patent Application No. 201810111369.8, filed Feb. 5, 2018, and entitled "METHODS, APPARATUSES, AND DEVICES FOR GENERATING WORD VECTORS," which are incorporated herein by reference in their entirety.

TECHNICAL FIELD

The present specification relates to the technical field of computer software, and in particular, to methods, apparatuses, and devices for generating word vectors.

BACKGROUND

Most of today's natural language processing solutions employ a neural network-based architecture in which an important underlying technology is word vector. A word vector is a vector that maps a word to a fixed number of dimensions, where the vector indicates the semantic information of the word.

In existing technologies, commonly used algorithms for generating word vectors include, for example, Google's word vector algorithm, Microsoft's deep neural network algorithm, etc.

In view of the existing technologies, there is a need for more accurate solutions for generating word vectors.

BRIEF SUMMARY

Implementations of the present specification provide methods, apparatuses, and devices for generating word vectors, to provide a more reliable solution for generating word vectors.

The implementations of the present specification provide the following solutions:

An implementation of the present specification provides a method for generating word vectors, including: obtain words by segmenting a corpus; establish a feature vector for each obtained word based on n-ary characters corresponding to the obtained word, where each n-ary character represents n consecutive characters of a word corresponding to the n-ary character; train a convolutional neural network based on the feature vectors of the obtained words and the feature vectors of context words associated with each obtained word in the corpus; and generate a word vector for each obtained word based on the feature vector of the obtained word and the trained convolutional neural network.

An implementation of the present specification provides an apparatus for generating word vectors, including: an acquisition module, configured to obtain words by segmenting a corpus; an establishment module, configured to establish a feature vector for each obtained word based on n-ary characters corresponding to the obtained word, where each n-ary character represents n consecutive characters of a word corresponding to the n-ary character; a training module, configured to train a convolutional neural network based on the feature vectors of the obtained words and the feature vectors of context words associated with each obtained word in the corpus; and a generation module, configured to generate a word vector for each obtained word based on the feature vector of the obtained word and the trained convolutional neural network.

An implementation of the present specification provides another method for generating word vectors, including:

Step 1: Establishing a vocabulary of words obtained by segmenting a corpus, where the obtained words exclude a word that appears for less than a predetermined or dynamically determined number of times in the corpus.

Step 2: Determining a total number of n-ary characters corresponding to all of the obtained words, where same n-ary characters are counted once, and each n-ary character represents n consecutive characters of an obtained word corresponding to the n-ary character.

Step 3: Establishing, for each obtained word, based on each n-ary character corresponding to the obtained word, a feature vector whose dimensionality is the total number, where each dimension of the feature vector corresponds to a different n-ary character, and the value of each dimension indicates whether a corresponding n-ary character is mapped to the obtained word corresponding to the feature vector.

Step 4: Traversing the corpus on which word segmentation is performed, and performing step 5 with respect to the current word accessed during the traversal, and if the traversal is completed, performing step 6; otherwise continuing the traversal.

Step 5: Using the current word as a center, sliding towards both sides for at most k words to establish a window, and using the words in the window except the current word as context words, inputting feature vectors of the context words associated with the current word into a convolutional layer of the convolutional neural network for convolutional calculation, and inputting a result of the convolutional calculation into a pooling layer of the convolutional neural network for pooling calculation to obtain a first vector; inputting a feature vector of the current word and a feature vector of a negative sample word selected in the corpus into the full connection layer of the convolutional neural network for calculation to obtain a second vector and a third vector; and updating parameters of the convolutional neural network based on the first vector, the second vector, the third vector, and a specified loss function, where the convolutional calculation is performed according to the following formula:

$$\tilde{x}_i = x_{i:i+\theta-1} = [x_i^T, x_{i+1}^T, \ldots, x_{i+\theta-1}^T]^T$$

$$y_i = \sigma(\omega \tilde{x}_i + \zeta)$$

the pooling calculation is performed according to the following formula:

$$c(j) = \max_{i=1,2,\ldots,t-\theta+1} \{y_i(j)\}, \text{ or } c(j) = \operatorname*{average}_{i=1,2,\ldots,t-\theta+1} \{y_i(j)\}$$

and the loss function includes:

$$l(w, c; \omega, \zeta, \varsigma, \tau) = \log\left(1 + \sum_{m=1}^{\lambda} \exp(-\gamma \cdot (s(w, c) - s(w'_m, c)))\right)$$

where $x_i$ indicates a feature vector of the $i^{th}$ context word; $x_{i:i+\theta-1}$ indicates a vector that is obtained by concatenating the feature vectors of the $i^{th}$ to the $i+\theta-1^{th}$ context words; $y_i$ indicates the $i^{th}$ element in the vector that is obtained through the convolutional calculation; $\omega$ indicates weight parameters of the convolutional layer; $\zeta$ indicates offset parameters of the convolutional layer; $\sigma$ indicates an activation function; max indicates a maximum value function; average indicates an average value function; c(j) indicates the $j^{th}$ element in the first vector that is obtained through pooling calculation; t indicates the number of context words; c indicates the first vector; w indicates the second vector; $w_m'$ indicates the third vector corresponding to the $m^{th}$ negative sample word; co indicates weight parameters of the convolutional layer; $\zeta$ indicates offset parameters of the convolutional layer; $\varsigma$ indicates weight parameters of the full connection layer; $\tau$ indicates offset parameters of the full connection layer; $\gamma$ indicates a hyperparameter; s indicates a similarity calculation function; and $\lambda$ indicates the number of negative sample words.

Step 6: Inputting the feature vector of each obtained word into the full connection layer of the trained convolutional neural network for calculation to obtain corresponding word vectors.

An implementation of the present specification provides a device for generating word vectors, including: at least one processor, and a memory communicatively connected to the at least one processor, where the memory stores instructions that can be executed by the at least one processor, and the instructions are executed by the at least one processor to enable the at least one processor to: obtain words by segmenting a corpus; establish a feature vector for each obtained word based on n-ary characters corresponding to the obtained word, where each n-ary character represents n consecutive characters of a word corresponding to the n-ary character; train a convolutional neural network based on the feature vectors of the obtained words and the feature vectors of context words associated with each obtained word in the corpus; and generate a word vector for each obtained word based on the feature vector of the obtained word and the trained convolutional neural network.

The previously described at least one technical solution adopted in the implementations of the present specification can achieve the following beneficial effects: The convolutional neural network can depict the context and overall semantic information of the word through the convolutional calculation and the pooling calculation and extract more context and semantic information, and the n-ary character can express the word more finely, so that the word vector can be more accurately generated.

BRIEF DESCRIPTION OF DRAWINGS

To describe the technical solutions in the implementations of the present specification or in the existing technologies more clearly, the following is a brief introduction of the accompanying drawings for illustrating such technical solutions. Clearly, the accompanying drawings described below are merely some implementations of the present specification, and a person skilled in the art can derive other drawings from such accompanying drawings without making innovative efforts.

DETAILED DESCRIPTION

Implementations of the present specification provide methods, apparatuses, and devices for generating word vectors.

To enable a person skilled in the art to better understand technical solutions in the present specification, the following clearly and completely describes the technical solutions in the implementations of the present specification with reference to the drawings that accompany the implementations. Clearly, the described implementations are merely some rather than all of the implementations of the present application. Based on the implementations of the present specification, all other implementations obtained by a person of ordinary skill in the art without making innovative efforts shall fall within the protection scope of the present application.

Figure 1:
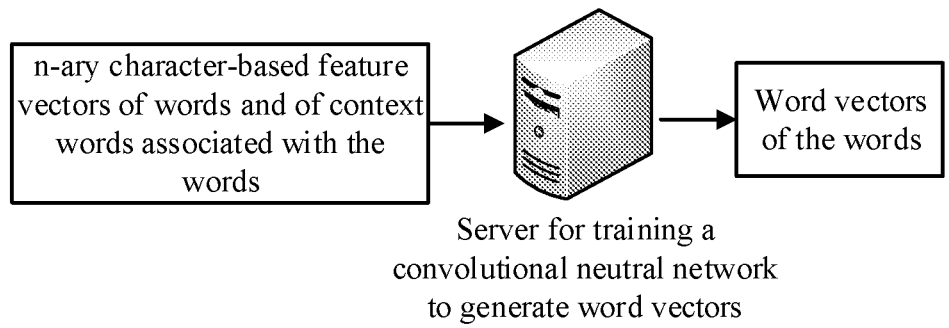
FIG. 1 is a schematic diagram illustrating an overall architecture involved in an actual application scenario of solutions of the present specification.

FIG. 1 is a schematic diagram of an overall architecture involved in an actual application scenario of solutions of the present specification. The overall architecture relates primarily to a server that is used to train a convolutional neural network to generate word vectors. A feature vector of each obtained word can be established based on an n-ary character, and a convolutional neural network can be trained based on the feature vectors and the context of the words. The feature vectors can be established by the server or another device.

The solutions of the present specification are applicable to languages that are formed by alphabetic letters, such as English, French, German, and Spanish, and are also applicable to languages that are formed by non-alphabetic elements but can be easily mapped to alphabetic letters, such as Chinese (which can be mapped to pinyin letters) and Japanese (which can be mapped to Roman letters). For ease of description, in the following implementations, the solutions of the present specification are mainly described with respect to scenarios of English.

Figure 2:
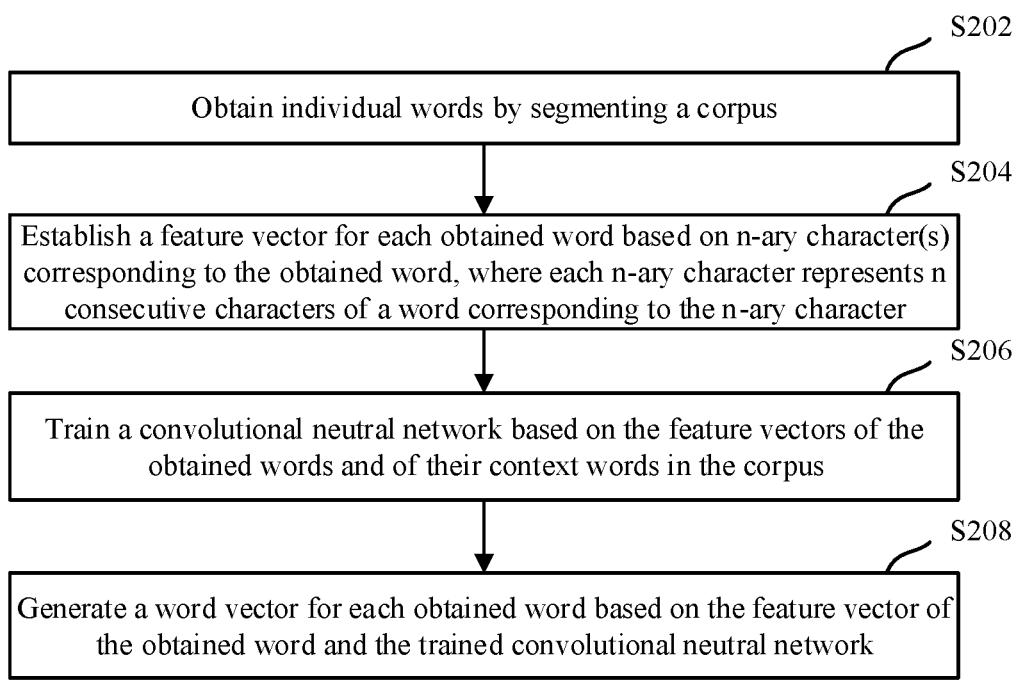
FIG. 2 is a schematic flowchart illustrating a method for generating word vectors according to some implementations of the present specification.

FIG. 2 is a schematic flowchart illustrating a method for generating word vectors according to some implementations of the present specification. From the perspective of a device, an actor that executes the process includes, for example, at least one of a personal computer, a large- or medium-sized computer, a computer cluster, a mobile phone, a tablet computer, a smart wearable device, a vehicle, etc.

The process in FIG. 2 includes the following steps:

S202: Obtain individual words by segmenting a corpus.

In some implementations of the present specification, more specifically, the obtained words can be at least some of the words that appear at least once in the corpus. To facilitate subsequent processing, each word can be stored in a vocabulary, and individual words can be read from the vocabulary for use.

It is worthwhile to note that, considering that if a word appears too few times in the corpus, the number of corresponding iterations in the subsequent processing is also small, and the training result reliability is relatively low, such a word can be screened out. In this case, more specifically, the obtained words are some words out of all the words that appear at least once or a specified number of times in the corpus. The specified number can be manually defined, or automatically determined based on a frequency distribution of words that appear in the corpus.

S204: Establish a feature vector for each obtained word based on n-ary characters corresponding to the obtained word, where each n-ary character represents n consecutive characters of a word corresponding to the n-ary character.

In this implementation of the present specification, characters of the word can include the characters constituting the word, or other characters to which the characters constituting the word are mapped. For example, the word "boy" includes characters "b", "o", and "y".

To express the order of words, some mark characters can be added to the original words based on certain rules, and these mark characters can also be considered characters of the words. For example, a mark character can be added to a position such as a start position and/or an end position of the original word, and after such marking, the word "boy" can take the form of "# boy #", and the two "#" can be considered characters of the word "boy".

Further, n is an integer not less than 1. Using "# boy #" as an example, the word includes the following 3-ary characters: "# bo" (the $1^{st}$ to $3^{rd}$ characters), "boy" (the $2^{nd}$ to $4^{th}$ characters), and "oy #" (the $3^{rd}$ to $5^{th}$ characters); and includes the following 4-ary characters: "# boy" (the $1^{st}$ to $4^{th}$ characters) and "boy #" (the $2^{nd}$ to $5^{th}$ characters).

In some implementations of the present specification, the value of n can be dynamically adjusted. For the same word, at the time of determining the n-ary characters corresponding to the word, "n" can have a single value, e.g., n=3 means that only 3-ary characters corresponding to the word are determined, or have multiple values, e.g., n=3, 4 means that both 3-ary characters and 4-ary characters corresponding to the word are determined.

To facilitate computer processing, n-ary characters can be represented based on specified codes (e.g., numbers). For example, different characters or different n-ary characters can be represented by different codes or code strings.

In some implementations of the present specification, the feature vector of a word can have values assigned to different dimensions to indicate the n-ary characters corresponding to the word. More precisely, the feature vector of the word can also be used to indicate the order of the n-ary characters corresponding to the word.

S206: Train a convolutional neural network based on the feature vectors of the obtained words and of their context words in the corpus.

In some implementations of the present description, the convolution layer of the convolution neural network is used for extracting local information from neurons, and the pooling layer of the convolution neural network is used for synthesizing all local information of the convolution layer to obtain global information. Specifically, in scenarios of the present specification, local information can refer to overall semantics of some context words associated with the current word, e.g., each obtained word can be used as the current word, and global information can refer to overall semantics of all context words associated with the current word.

S208: Generate a word vector for each obtained word based on the feature vector of the obtained word and the trained convolutional neural network.

By training the convolutional neural network, appropriate parameters can be determined for the convolutional neural network, so that the convolutional neural network can more accurately depict the overall semantics of the context words and the corresponding semantics of the current words. The parameters include, for example, weight parameters and offset parameters.

The word vector can be obtained by making inferences from the feature vector based on the trained convolutional neural network.

By using the method in FIG. 2, the convolutional neural network can depict the overall semantic information of the context of the word through convolutional calculation and pooling calculation and extract more semantic information of the context, and the n-ary characters can express the word more finely, so that the word vector can be more accurately generated.

Based on the method shown in FIG. 2, some implementations of the present specification further provides some implementation solutions of the method, as well as extension solutions, which are described below.

In some implementations of the present specification, for step S204, the establishing of a feature vector for each obtained word based on the n-ary characters corresponding to the obtained word can specifically include:

determining a total number of different n-ary characters for all n-ary characters corresponding to the obtained word; and establishing, for each word, a feature vector whose dimensionality is determined based on the total number, where the feature vector can be assigned values to different dimensions to indicate the n-ary characters corresponding to the word.

For example, all of the n-ary characters corresponding to the obtained word are indexed from 0 at an increment of 1. The same n-ary characters have the same index number. Assuming that the total number is $N_c$, then the index number of the last n-ary character is N−1. A feature vector whose dimension is $N_c$ is established for each word. Specifically, assuming that n=3, and that the indexes of all the 3-ary characters corresponding to a word are 2, 34, and 127, then the $2^{nd}$, the $34^{th}$, and the $127^{th}$ elements in the feature vector established for that word can be 1, and the remaining elements are 0. Using the same example, in some embodiments, the values assigned to the 2nd, the 34th, and the 127th elements in the feature vector can be different from one another, to reflect different weights or to indicate an order of the 3-ary characters corresponding to the word.

Figure 3:
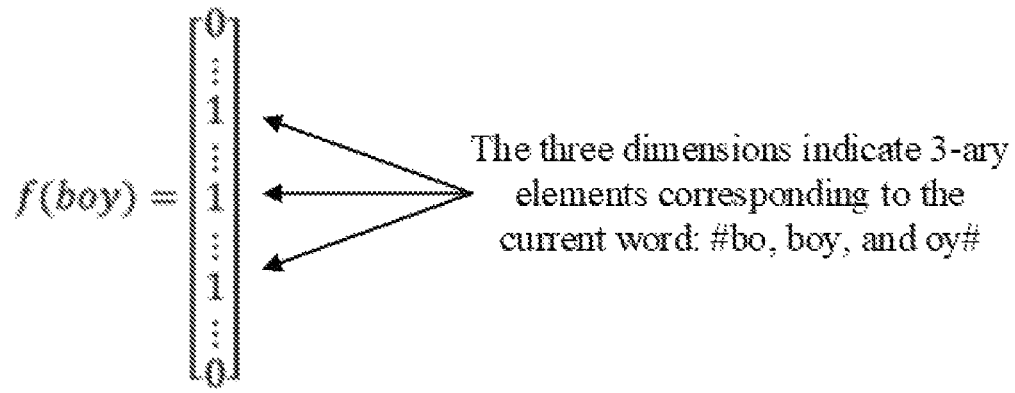
FIG. 3 is a schematic diagram illustrating a feature vector of an English word in an application scenario according to some implementations of the present specification.

More intuitively, based on the above example, this implementation of the present specification provides a schematic diagram illustrating a feature vector of an English word in an application scenario, as shown in FIG. 3. The English word is "boy", and a mark character "#" is added at the start position and the end position. f indicates the process of establishing a feature vector based on the word. The feature vector is, for example, a column vector that is established based on each 3-ary character of "boy". It can be seen that, the values of three elements in the feature vector are 1s, which respectively indicate the 3-ary characters "# bo", "boy", and "oy #"; and the values of other elements are 0s, which indicates that "boy" does not correspond to any other 3-ary character.

In this implementation of the present specification, when the convolutional neural network is trained, the goal is to ensure that the similarity between the feature vectors of the current word and its context words to be relatively high after inferences made based on the trained convolutional neural network.

Further, context words are regarded as positive sample words, and, as a contrast, one or more negative sample words associated with the current word can be selected based on certain rules to be involved in the training, so as to ensure fast training convergence and obtain more accurate training results. In this case, the goal can further include ensuring that the similarity between the feature vectors of the current word and the negative sample word are relatively low after inferences have been made based on the trained convolutional neural network. Negative sample words can be selected randomly in the corpus, or selected in the non-context words, etc. The present specification does not limit the specific ways of calculating such similarity. For example, the similarity can be calculated based on a cosine operation of the angle between vectors, the similarity can be calculated based on the square sum operation of the vectors, etc.

According to the above analysis, for step S206, the convolutional neural network is trained based on the feature vectors of the obtained words as well as the feature vectors of their context words in the corpus. Specifically, the training can include:

training the convolutional neural network based on the feature vectors of the obtained words as well as the feature vectors of their context words and their negative sample words in the corpus.

In some implementations of the present specification, the training process of the convolutional neural network can be iteratively performed. A relatively simple way is to traverse the corpus after word segmentation, and each time one of the obtained words is accessed, an iteration is performed, until the traversal is complete. The convolutional neural network can then be considered to have been trained using the corpus.

Specifically, the training of the convolutional neural network based on the feature vectors of the obtained words and the feature vectors of their context words and negative sample words in the corpus can include:

traversing the corpus after word segmentation, and executing the following for the current word accessed during the traversal (the content of this execution corresponds to a process during one iteration):

for the current word obtained after word segmentation, determining one or more context words and negative sample words in the corpus; inputting feature vectors of the context words associated with the current word into a convolutional layer of the convolutional neural network for convolutional calculation; inputting the result of the convolutional calculation into a pooling layer of the convolutional neural network for pooling calculation to obtain a first vector; inputting a feature vector of the current word into the full connection layer of the convolutional neural network for calculation to obtain a second vector, and inputting a feature vector of a negative sample word associated with the current word into the full connection layer of the convolutional neural network for calculation to obtain a third vector; and updating parameters of the convolutional neural network based on the first vector, the second vector, the third vector, and a specified loss function.

Figure 4:
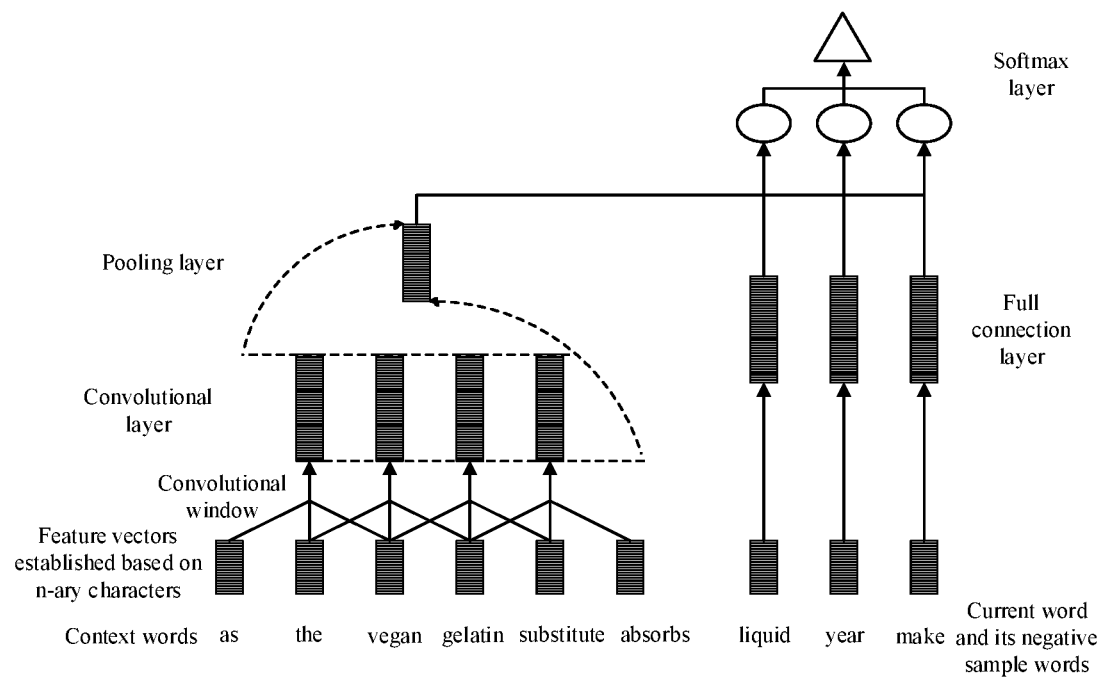
FIG. 4 is a schematic diagram illustrating a convolutional neural network in an actual application scenario according to some implementations of the present specification.

More intuitively, the above process is described with reference to FIG. 4. FIG. 4 is a schematic diagram illustrating a convolutional neural network in an actual application scenario according to some implementations of the present specification.

The convolutional neural network in FIG. 4 mainly includes a convolutional layer, a pooling layer, a full connection layer, and a Softmax layer. In the process of training the convolutional neural network, the feature vectors of the context words are processed by the convolutional layer and the pooling layer to extract the semantic information of the context words as a whole, and the feature vector associated with the current word and its negative sample words can be processed by the full connection layer. Detailed description is provided below.

In this implementation of the present specification, it is assumed that a sliding window is used to determine a context word, the center of the sliding window is the current word being accessed during the traversal, and the words in the sliding window other than the current word are context words. The feature vectors of all the context words are inputted to the convolutional layer, and then convolutional calculation can be performed according to the following formula:

$$\tilde{x}_i = x_{i:i+\theta-1} = [x_i^T, x_{i+1}^T, \ldots, x_{i+\theta-1}^T]^T$$

$$y_i = \sigma(\omega \tilde{x}_i + \zeta)$$

where $x_i$ indicates a feature vector (which is assumed to be a column vector) of the $i^{th}$ context word; $x_{i:i+\theta-1}$ indicates a vector that is obtained by concatenating the feature vectors of the $i^{th}$ to the $i+\theta-1^{th}$ context words; $y_i$ indicates the $i^{th}$ element in the vector (the result of the convolutional calculation) obtained through the convolutional calculation; ω indicates the weight parameter(s) of the convolutional layer; indicates the offset parameter(s) of the convolutional layer; a indicates an activation function, for example, if the Sigmoid function is used, $$\sigma = \frac{1}{1+e^{-x}}.$$

Further, after the result of the convolutional calculation is obtained, the result can be input into the pooling layer for pooling calculation. Specifically, maximum pooling calculation or average pooling calculation can be used.

For maximum pooling calculation, as an example, the following formula is used:

$$c(j) = \max_{i=1,2,\ldots,t-\theta+1} \{y_i(j)\}$$

For average pooling calculation, as an example, the following formula is used:

$$c(j) = \operatorname*{average}_{i=1,2,\ldots,t-\theta+1} \{y_i(j)\}$$

where max indicates a maximum value function; average indicates an average value function; c(j) indicates the $j^{th}$ element in the first vector obtained through the pooling calculation; and t indicates the number of context words.

FIG. 4 also exemplarily illustrates the current word "liquid" in a corpus, 6 context words "as", "the", "vegan", "gelatin", "substitute", and "absorbs" associated with the current word in the corpus, and 2 negative sample words "year" and "make" associated with the current word in the corpus. In FIG. 4, it is assumed that all the feature vectors established based on the n-ary characters have $N_c$ dimensions, and θ=3 indicates the length of the convolution window. Then, the vectors obtained through concatenation during the convolutional calculation have $\theta \cdot N_c = 3 \cdot N_c$ dimensions.

The feature vector of the current word can be input to the full connection layer, and can be calculated according to, for example, the following formula:

$$w=\sigma(\varsigma \cdot q+\tau)$$

where w indicates the second vector that is output by the full connection layer after processing the feature vector of the current word; ç indicates the weight parameter(s) of the full connection layer; q indicates the feature vector of the current word; and τ indicates the offset parameter(s) of the full connection layer.

Similarly, for each negative sample word, a respective feature vector can be input to the full connection layer and processed in a way as the current word is processed, to obtain a third vector, and the third vector corresponding to the $m^{th}$ negative sample word is denoted as $w_m'$. In other words, multiple third vectors can be obtained and each third vector is generated based on a different negative sample word associated with the current word.

Further, the updating the parameters of the convolutional neural network based on the first vector, the second vector, the third vector, and the specified loss function can include, for example, calculating a first similarity between the second vector and the first vector, and a second similarity between the third vector and the first vector; and updating the parameters of the convolutional neural network based on the first similarity, the second similarity, and the specified loss function.

A loss function is used as an example. The loss function can be, for example:

$$l(w, c; \omega, \zeta, \varsigma, \tau) = \log\left(1 + \sum_{m=1}^{\lambda} \exp(-\gamma \cdot (s(w, c) - s(w_m', c)))\right)$$

where c indicates the first vector; w indicates the second vector; $w_m'$ indicates the third vector corresponding to the $m^{th}$ negative sample word; ω indicates weight parameter(s) of the convolutional layer; ζ indicates offset parameter(s) of the convolutional layer; ç indicates weight parameter(s) of the full connection layer; τ indicates offset parameter(s) of the full connection layer; γ indicates a hyperparameter; s indicates a similarity calculation function; and λ indicates the number of negative sample words.

In practice, if no negative sample word is used, the term for calculating the similarity between the first vector and the third vector can be removed from the loss function used.

In some implementations of the present specification, after training of the convolutional neural network, a word vector can be generated by making inferences from the feature vector. Specifically, for step S208, the generating of a word vector for each obtained word based on the feature vector of each obtained word and the trained convolutional neural network can specifically include:

inputting the feature vector of each obtained word into the full connection layer of the trained convolutional neural network for calculation to obtain a vector output, which is considered a corresponding word vector.

Figure 5:
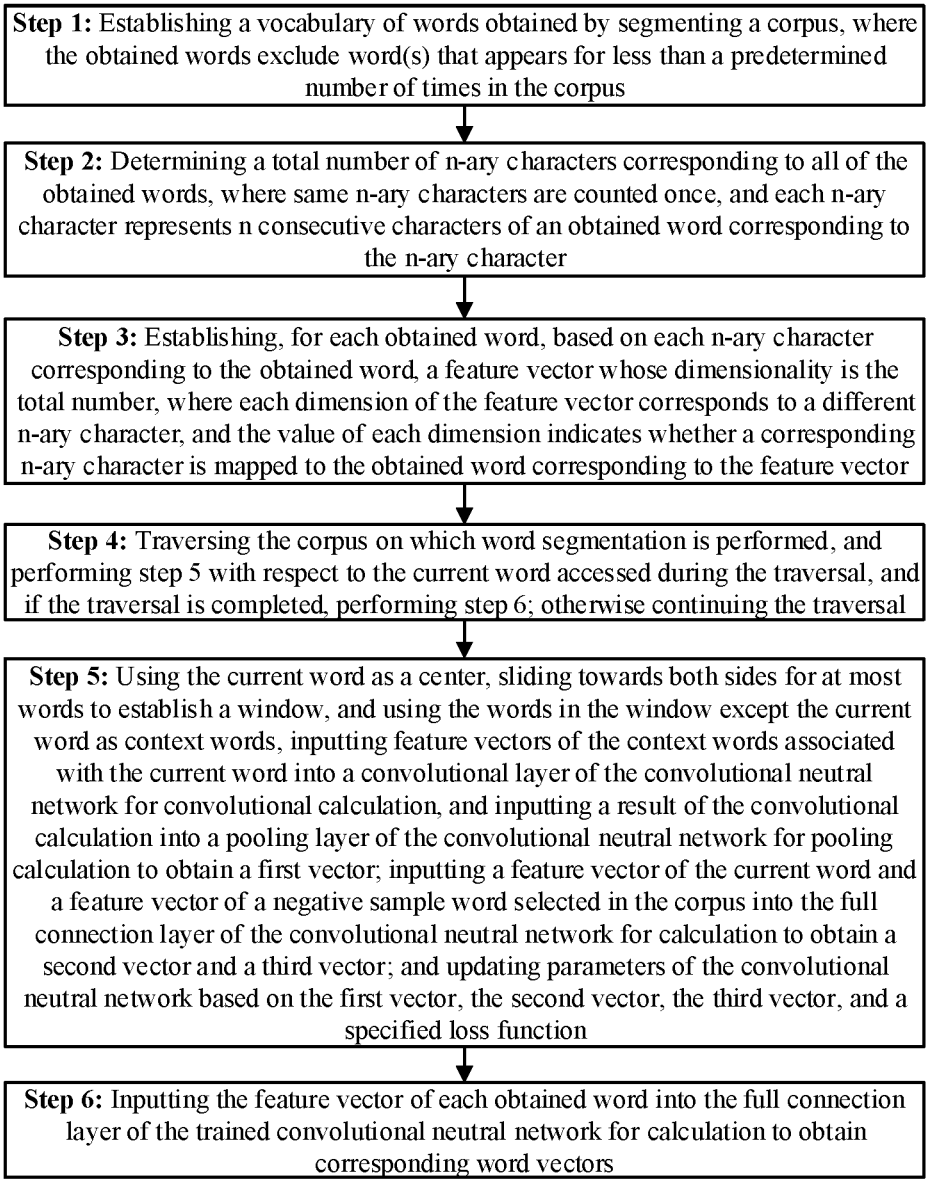
FIG. 5 is a schematic flowchart illustrating another method for generating word vectors according to some implementations of the present specification.

Based on the same idea, some implementations of the present specification provides another method for generating word vectors, which is an example implementation of the method for generating word vectors in FIG. 2. FIG. 5 is a schematic flowchart illustrating such a method for generating word vectors.

The process in FIG. 5 includes following steps:

Step 1: Establishing a vocabulary of words obtained by segmenting a corpus, where the obtained words exclude a word that appears for less than a predetermined or dynamically determined number of times in the corpus; going to step 2.

Step 2: Determining a total number of n-ary characters corresponding to all of the obtained words, where same n-ary characters are counted once, and each n-ary character represents n consecutive characters of an obtained word corresponding to the n-ary character; going to step 3.

Step 3: Establishing, for each obtained word, based on each n-ary character corresponding to the obtained word, a feature vector whose dimensionality is the total number, where each dimension of the feature vector corresponds to a different n-ary character, and the value of each dimension indicates whether a corresponding n-ary character is mapped to the obtained word corresponding to the feature vector; going to step 4.

Step 4: Traversing the corpus on which word segmentation is performed, and performing step 5 with respect to the current word accessed during the traversal, and if the traversal is completed, performing step 6; otherwise continuing the traversal.

Step 5: Using the current word as a center, sliding towards both sides for at most k words to establish a window, and using the words in the window except the current word as context words, inputting feature vectors of the context words associated with the current word into a convolutional layer of the convolutional neural network for convolutional calculation, and inputting a result of the convolutional calculation into a pooling layer of the convolutional neural network for pooling calculation to obtain a first vector; inputting a feature vector of the current word and a feature vector of a negative sample word selected in the corpus into the full connection layer of the convolutional neural network for calculation to obtain a second vector and a third vector; and updating parameters of the convolutional neural network based on the first vector, the second vector, the third vector, and a specified loss function, where the convolutional calculation is performed according to the following formula:

$$\tilde{x}_i = x_{i:i+\theta-1} = [x_i^T, x_{i+1}^T, \ldots, x_{i+\theta-1}^T]^T$$

$$y_i = \sigma(\omega \tilde{x}_i + \zeta)$$

the pooling calculation is performed according to the following formula:

$$c(j) = \max_{i=1,2,\ldots,t-\theta+1} \{y_i(j)\}, \text{ or } c(j) = \underset{i=1,2,\ldots,t-\theta+1}{\text{average}} \{y_i(j)\}$$

and the loss function includes:

$$l(w, c; \omega, \zeta, \varsigma, \tau) = \log\left(1 + \sum_{m=1}^{\lambda} \exp(-\gamma \cdot (s(w, c) - s(w_m', c)))\right)$$

where $x_i$ indicates a feature vector of the $i^{th}$ context word; $x_{i:i+\theta-1}$ indicates a vector that is obtained by concatenating the feature vectors of the $i^{th}$ to the $i+\theta-1^{th}$ context words; $y_i$ indicates the $i^{th}$ element in the vector that is obtained through the convolutional calculation; ω indicates weight parameter(s) of the convolutional layer; ζ indicates offset parameter(s) of the convolutional layer; σ indicates an activation function; max indicates a maximum value function; average indicates an average value function; c(j) indicates the $j^{th}$ element in the first vector that is obtained through pooling calculation; t indicates the number of context words; c indicates the first vector; w indicates the second vector; indicates the third vector corresponding to the $m^{th}$ negative sample word; ω indicates weight parameter(s) of the convolutional layer; ζ indicates offset parameter(s) of the convolutional layer; ç indicates weight parameter(s) of the full connection layer; τ indicates offset parameter(s) of the full connection layer; γ indicates a hyperparameter; s indicates a similarity calculation function; and λ indicates the number of negative sample words.

Step 6: Inputting the feature vector of each obtained word into the full connection layer of the trained convolutional neural network for calculation to obtain corresponding word vectors.

The steps in this method for generating word vectors can be performed by the same or different modules, which are not specifically limited in the present specification.

The foregoing has described the method for generating word vectors according to some implementations of the present specification. Based on the same idea, some implementations of the present specification further provides a corresponding apparatus, as shown in FIG. 6.

Figure 6:
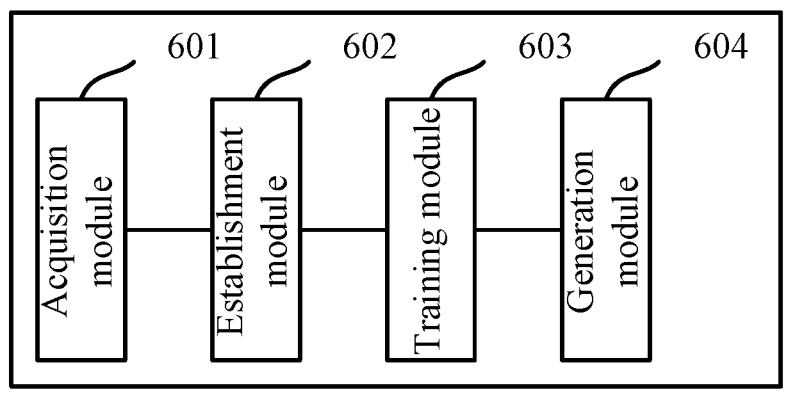
FIG. 6 is a schematic structural diagram illustrating an apparatus for generating word vectors that corresponds to FIG. 2 according to some implementations of the present specification.

FIG. 6 is a schematic structural diagram illustrating an apparatus for generating word vectors that corresponds to FIG. 2 according to some implementations of the present specification. The apparatus can be located in the entity to execute the process in FIG. 2 and includes: an acquisition module 601, configured to obtain individual words by segmenting a corpus; an establishment module 602, configured to establish a feature vector for each obtained word based on n-ary characters corresponding to the obtained word, where each n-ary character represents n consecutive characters of the word corresponding to the n-ary character; a training module 603, configured to train a convolutional neural network based on the feature vectors of the obtained words and the feature vectors of context words associated with each obtained word in the corpus; and a generation module 604, configured to generate a word vector for each obtained word based on the feature vector of each obtained word and the trained convolutional neural network.

Optionally, characters of a word include each character constituting the word, and mark characters added to the start position and/or the end position of the word.

Optionally, the establishment module 602's establishing of a feature vector of each obtained word based on each n-ary character corresponding to each word specifically includes: determining, by the establishment module 602, a total number of distinct n-ary characters in a collection of respective n-ary characters corresponding to each of the obtained words; and establishing, for each word, a feature vector whose dimensionality is determined based on the total number, where the feature vector can be assigned values to different dimensions to indicate n-ary characters corresponding to the obtained word.

Optionally, the training module 603's training of the convolutional neural network based on the feature vectors of the obtained words and the feature vectors of the context words and the negative sample words associated with each obtained word in the corpus specifically includes:

training, by the training module 603, the convolutional neural network based on the feature vectors of the obtained words and the feature vectors of the context words and the negative sample words associated with the words in the corpus.

Optionally, the training module 603's training of the convolutional neural network based on the feature vectors of the obtained words and the feature vectors of the context words and the negative sample words associated with the words in the corpus specifically includes:

traversing, by the training module 603, the corpus after word segmentation, and executing the following when the current word is accessed during the traversal: determining one or more context words and negative sample words associated with the current word in the corpus after word segmentation; inputting feature vectors of the context words associated with the current word into a convolutional layer of the convolutional neural network for convolutional calculation; inputting the result of the convolutional calculation into a pooling layer of the convolutional neural network for pooling calculation to obtain a first vector; inputting a feature vector of the current word into the full connection layer of the convolutional neural network for calculation to obtain a second vector, and inputting a feature vector of a negative sample word associated with the current word into the full connection layer of the convolutional neural network for calculation to obtain a third vector; and updating parameters of the convolutional neural network based on the first vector, the second vector, the third vector, and a specified loss function.

Optionally, the training module 603's performing of a convolutional calculation specifically includes:

performing, by the training module 603, the convolutional calculation according to the following formula:

$$\tilde{x}_i = x_{i:i+\theta-1} = [x_i^T, x_{i+1}^T, \ldots, x_{i+\theta-1}^T]^T$$

$$y_i = \sigma(\omega \tilde{x}_i + \zeta)$$

where $x_i$ indicates a feature vector of the $i^{th}$ context word; $x_{i:i+\theta-1}$ indicates a vector that is obtained by concatenating the feature vectors of the $i^{th}$ to the $i+\theta-1^{th}$ context words; $y_i$ indicates the $i^{th}$ element in the vector that is obtained through the convolutional calculation; ω indicates weight parameter(s) of the convolutional layer; indicates offset parameter(s) of the convolutional layer; a indicates an activation function.

Optionally, the training module 603's performing of a pooling calculation specifically includes:

performing, by the training module 603, maximum pooling calculation or average pooling calculation.

Optionally, the training module 603's updating of the parameters of the convolutional neural network based on the first vector, the second vector, the third vector, and the specified loss function specifically includes: calculating, by the training unit 603, a first similarity between the second vector and the first vector, and a second similarity between the third vector and the first vector; and updating the parameters of the convolutional neural network based on the first similarity, the second similarity, and the specified loss function.

Optionally, the loss function specifically includes:

$$l(w, c; \omega, \zeta, \varsigma, \tau) = \log\left(1 + \sum_{m=1}^{\lambda} \exp(-\gamma \cdot (s(w, c) - s(w'_m, c)))\right)$$

where c indicates the first vector; w indicates the second vector; $w_m'$ indicates the third vector corresponding to the $m^{th}$ negative sample word; co indicates weight parameter(s) of the convolutional layer; ζ indicates offset parameter(s) of the convolutional layer; ç indicates weight parameter(s) of the full connection layer; τ indicates offset parameter(s) of the full connection layer; γ indicates a hyperparameter; s indicates a similarity calculation function; and λ indicates the number of negative sample words.

Optionally, the generation module 604's generating of a word vector for each obtained word based on the feature vector of the obtained word, and the trained convolutional neural network specifically includes:

inputting, by the generation module 604, the feature vector of each obtained word into the full connection layer of the trained convolutional neural network for calculation to obtain a vector output after the calculation as a corresponding word vector.

Based on the same idea, an implementation of the present specification further provides a device for generating word vectors, including: at least one processor, and a memory communicatively connected to the at least one processor, where the memory stores instructions that can be executed by the at least one processor, and the instructions are executed by the at least one processor to enable the at least one processor to: obtain individual words by segmenting a corpus; establish a feature vector for each obtained word based on n-ary characters corresponding to the obtained word, where each n-ary character represents n consecutive characters of a word corresponding to the n-ary character; train a convolutional neural network based on the feature vectors of the obtained words and the feature vectors of context words associated with each obtained word in the corpus; and generate a word vector for each obtained word based on the feature vector of the obtained word and the trained convolutional neural network.

Based on the same idea, an implementation of the present specification further provides a non-volatile computer storage medium, where the storage medium stores computer executable instructions that are used to: obtain individual words by segmenting a corpus; establish a feature vector for each obtained word based on n-ary characters corresponding to the obtained word, where each n-ary character represents n consecutive characters of a word corresponding to the n-ary character; train a convolutional neural network based on the feature vectors of the obtained words and the feature vectors of context words associated with each obtained word in the corpus; and generate a word vector for each obtained word based on the feature vector of the obtained word and the trained convolutional neural network.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

The implementations of the present specification are described in a progressive way. For same or similar parts of the implementations, mutual references can be made to the implementations. Each implementation focuses on a difference from the other implementations. In particular, for implementations of an apparatus, a device, and a non-volatile computer storage medium, because implementations of an apparatus, a device, and a non-volatile computer storage medium are basically similar to method implementation, description is relatively simple, and references can be made to parts of the method implementation descriptions.

The apparatus, device, and non-volatile computer storage medium provided in the implementations of the present specification correspond to the method. Therefore, the apparatus, device, and non-volatile computer storage medium also have beneficial technical effects that are similar to those of corresponding method. Because the beneficial technical effects of the methods have been described in detail above, the beneficial technical effects of the corresponding apparatus, device, and non-volatile computer storage medium details are omitted here for simplicity.

In the 1990s, whether technology improvement was hardware improvement (for example, improvement of a circuit structure, such as a diode, a transistor, or a switch) or software improvement (improvement of a method procedure) could be clearly distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed using the several described hardware description languages and is programmed into an integrated circuit.

A controller can be implemented using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicon Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Alternatively, the device configured to implement various functions can even be considered as both a software module implementing the method and a structure in the hardware component.

The system, device, module, or unit illustrated in the previous implementations can be implemented using a computer chip or an entity, or can be implemented using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

For convenience of description, the above devices are described separately in terms of their functions. Certainly, functions of the units can be implemented in the same or different software or hardware when the present specification is implemented.

The present specification is described with reference to at least one of a flowchart or block diagram of the method, device (system), and computer program product according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer readable medium does not include transitory media such as a modulated data signal and carrier.

It is also worthwhile to note that terms "include", "include" or any other variant is intended to cover non-exclusive inclusion, so that processes, methods, commodities or devices that include a series of elements include not only those elements but also other elements that are not explicitly listed, or elements inherent in such processes, methods, commodities or devices. An element described by "includes a . . . " further includes, without more constraints, another identical element in the process, method, product, or device that includes the element.

A person skilled in the art should understand that the implementations of the present specification can be provided as methods, systems or computer program products. Therefore, the present specification can take a form of complete hardware implementations, complete software implementations, or implementations combining software and hardware. Further, the present specification can take a form of a computer program product implemented on one or more computer-usable storage media (including but not limited to disk storage, CD-ROM, and optical storage) containing computer-usable program code.

The present specification can be described in the general context of computer executable instructions executed by a computer, for example, a program module. Generally, the program module includes a routine, a program, an object, a component, a data structure, etc. executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

The implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related descriptions in the method implementation.

The above descriptions are merely examples of the present specification and are not intended to limit the present application. For a person skilled in the art, the present application can be subject to various modifications and variations. Any modification, equivalent replacement or improvement made within spirit and principles of the present application shall be included in claims of the present application.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for generating word vectors, comprising:
obtaining words by segmenting a corpus;
establishing a feature vector for each obtained word based, at least in part, on one or more n-ary characters corresponding to the obtained word, wherein each n-ary character represents n consecutive characters of a word;
training a convolutional neural network based, at least in part, on the feature vectors of the obtained words and the feature vectors of context words associated with each obtained word in the corpus by:
traversing the corpus after word segmentation, and performing the following actions responsive to a current word being accessed during the traversing:
determining one or more context words and one or more negative sample words associated with the current word in the corpus;
inputting feature vectors of the context words associated with the current word into a convolutional layer of the convolutional neural network for convolutional calculation;
inputting a result of the convolutional calculation into a pooling layer of the convolutional neural network for pooling calculation to obtain a first vector;
inputting a feature vector of the current word into a full connection layer of the convolutional neural network for calculation to obtain a second vector; and
inputting a feature vector of a negative sample word associated with the current word into the full connection layer of the convolutional neural network for calculation to obtain a third vector; and
updating parameters of the convolutional neural network based, at least in part, on the first vector, the second vector, the third vector, and a specified loss function; and
generating a word vector for each obtained word based, at least in part, on the feature vector of the obtained word and the trained convolutional neural network.

2. The method according to claim 1, wherein characters of an obtained word comprise each character constituting the obtained word, and mark characters added to one or more of a start position and an end position of the obtained word.

3. The method according to claim 1, wherein the establishing the feature vector for each obtained word based, at least in part, on one or more n-ary characters corresponding to the obtained word comprises:
determining a total number of distinct n-ary characters in a collection of respective n-ary characters corresponding to each of the obtained words; and
establishing, for each obtained word, a feature vector whose dimensionality is determined based, at least in part, on the total number.

4. The method according to claim 3, wherein the number of dimensions of the feature vector is the total number.

5. The method according to claim 3, wherein values are assigned to individual dimensions of the feature vector to indicate a mapping between n-ary characters and the obtained word.

6. The method according to claim 1, further comprising performing the convolutional calculation, at least in part, by concatenating the feature vectors of a subset of the context words associated with the current word.

7. The method according to claim 1, further comprising performing the pooling calculation by:
performing at least one of a maximum pooling calculation or an average pooling calculation.

8. The method according to claim 1, wherein updating the parameters of the convolutional neural network based, at least in part, on the first vector, the second vector, the third vector, and the specified loss function comprises:
calculating a first similarity between the second vector and the first vector, and a second similarity between the third vector and the first vector; and
updating the parameters of the convolutional neural network based, at least in part, on the first similarity, the second similarity, and the specified loss function.

9. The method according to claim 1, wherein the loss function includes at least a weight parameter of the convolutional layer, an offset parameter of the convolutional layer, a weight parameter of the full connection layer, an offset parameter of the full connection layer, a hyperparameter, and a similarity calculation function.

10. The method according to claim 1, wherein the generating a word vector for each obtained word based, at least in part, on the feature vector of the obtained word and the trained convolutional neural network comprises:
inputting the feature vector of each obtained word into the full connection layer of the trained convolutional neural network to obtain a vector output.

11. An apparatus for generating word vectors, comprising:
an acquisition module, configured to obtain words by segmenting a corpus;
an establishment module, configured to establish a feature vector for each obtained word based, at least in part, on one or more n-ary characters corresponding to the obtained word, wherein each n-ary character indicates n consecutive characters of a word;
a training module, configured to train a convolutional neural network based, at least in part, on the feature vectors of the obtained words and the feature vectors of context words associated with each obtained word in the corpus by:
traversing the corpus after word segmentation, and performing the following actions responsive to a current word being accessed during the traversal:
determining one or more context words and one or more negative sample words associated with the current word in the corpus;

inputting feature vectors of the context words associated with the current word into a convolutional layer of the convolutional neural network for convolutional calculation;

inputting a result of the convolutional calculation into a pooling layer of the convolutional neural network for pooling calculation to obtain a first vector;

inputting a feature vector of the current word into a full connection layer of the convolutional neural network for calculation to obtain a second vector; and inputting a feature vector of a negative sample word associated with the current word into the full connection layer of the convolutional neural network for calculation to obtain a third vector; and updating parameters of the convolutional neural network based, at least in part, on the first vector, the second vector, the third vector, and a specified loss function; and a generation module, configured to generate a word vector for each obtained word based on the feature vector of the obtained word and the trained convolutional neural network.

12. The apparatus according to claim 11, wherein characters of an obtained word comprise each character constituting the obtained word, and mark characters added to a start position and/or an end position of the obtained word.

13. The apparatus according to claim 11, wherein the establishing, by the establishment module, of a feature vector for each obtained word based, at least in part, on one or more n-ary characters corresponding to the obtained word comprises:

determining, by the establishment module, a total number of distinct n-ary characters in a collection of respective n-ary characters corresponding to each of the obtained words; and establishing, for each obtained word, a feature vector whose dimensionality is determined based, at least in part, on the total number.

14. The apparatus according to claim 13, wherein the number of dimensions of the feature vector is the total number.

15. The apparatus according to claim 13, wherein values are assigned to individual dimensions of the feature vector to indicate a mapping between n-ary characters and the obtained word.

16. The apparatus according to claim 11, wherein performing the convolutional calculation by the training module comprises:

performing, by the training module, the convolutional calculation according to the following formula:

$$\tilde{x}_i = x_{i:i+\theta-1} = [x_i^T, x_{i+1}^T, \ldots, x_{i+\theta-1}^T]^T$$

$$y_i = \sigma(\omega \tilde{x}_i + \zeta)$$

wherein $x_i$ indicates a feature vector of the $i^{th}$ context word; $x_{i:i+\theta-1}$ indicates a vector that is obtained by concatenating the feature vectors of the $i^{th}$ to the $i+\theta-1^{th}$ context words; $y_i$ indicates the $i^{th}$ element in the vector that is obtained through the convolutional calculation; $\omega$ indicates one or more weight parameters of the convolutional layer; $\zeta$ indicates one or more offset parameters of the convolutional layer; $\sigma$ indicates an activation function.

17. The apparatus according to claim 11, wherein performing the convolutional calculation by the training module comprises:

performing, by the training module, at least one of a maximum pooling calculation or an average pooling calculation.

18. The apparatus according to claim 11, wherein the updating, by the training module, of the parameters of the convolutional neural network based, at least in part, on the first vector, the second vector, the third vector, and the specified loss function comprises:

calculating, by the training unit, a first similarity between the second vector and the first vector, and a second similarity between the third vector and the first vector; and updating the parameters of the convolutional neural network based, at least in part, on the first similarity, the second similarity, and the specified loss function.

19. The apparatus according to claim 11, wherein the loss function comprises:

$$l(w, c; \omega, \zeta, \varsigma, \tau) = \log\left(1 + \sum_{m=1}^{\lambda} \exp(-\gamma \cdot (s(w, c) - s(w_m', c)))\right)$$

wherein c indicates the first vector; w indicates the second vector; $w_m'$ indicates the third vector corresponding to the $m^{th}$ negative sample word; $\omega$ indicates one or more weight parameters of the convolutional layer; $\zeta$ indicates one or more offset parameters of the convolutional layer; $\varsigma$ indicates one or more weight parameters of the full connection layer; $\tau$ indicates one or more offset parameters of the full connection layer; $\gamma$ indicates a hyperparameter; s indicates a similarity calculation function; and $\lambda$ indicates the number of negative sample words.

20. The apparatus according to claim 11, wherein the generating, by the generation module, of a word vector for each obtained word based, at least in part, on the feature vector of the obtained word and the trained convolutional neural network comprises:

inputting, by the generation module, the feature vector of each obtained word into the full connection layer of the trained convolutional neural network to obtain a vector output.

21. A method for generating word vectors, comprising:

Act 1: establishing a vocabulary of words obtained by segmenting a corpus, wherein the obtained words exclude a word that appears for less than a predetermined number of times in the corpus;

Act 2: determining a total number of n-ary characters corresponding to all of the obtained words, wherein same n-ary characters are counted once, and each n-ary character represents n consecutive characters of an obtained word corresponding to the n-ary character;

Act 3: establishing, for each obtained word, based on each n-ary character corresponding to the obtained word, a feature vector whose dimensionality is the total number, wherein each dimension of the feature vector corresponds to a different n-ary character, and the value of each dimension indicates whether a corresponding n-ary character is mapped to the obtained word corresponding to the feature vector;

Act 4: traversing the corpus on which word segmentation is performed, and performing Act 5 with respect to the current word accessed during the traversal, and if the traversal is completed, performing Act 6; otherwise continuing the traversal;

Act 5: using the current word as a center, sliding towards both sides for at most k words to establish a window, and using the words in the window except the current word as context words, inputting feature vectors of the context words associated with the current word into a convolutional layer of the convolutional neural network for convolutional calculation, and inputting a result of the convolutional calculation into a pooling layer of the convolutional neural network for pooling calculation to obtain a first vector; inputting a feature vector of the current word and a feature vector of a negative sample word selected in the corpus into the full connection layer of the convolutional neural network for calculation to obtain a second vector and a third vector; and updating parameters of the convolutional neural network based on the first vector, the second vector, the third vector, and a specified loss function, wherein the convolutional calculation is performed according to the following formula:

$$\tilde{x}_i = x_{i:i+\theta-1} = [x_i^T, x_{i+1}^T, \ldots, x_{i+\theta-1}^T]^T$$

$y_i = \sigma(\omega \tilde{x}_i + \zeta)$ the pooling calculation is performed according to the following formula:

$$c(j) = \max_{i=1,2,\ldots,t-\theta+1} \{y_i(j)\},$$

or $$c(j) = \operatorname*{average}_{i=1,2,\ldots,t-\theta+1} \{y_i(j)\}$$

and the loss function comprises:

$$l(w, c; \omega, \zeta, \varsigma, \tau) = \log\left(1 + \sum_{m=1}^{\lambda} \exp(-\gamma \cdot (s(w, c) - s(w'_m, c)))\right)$$

wherein $x_i$ indicates a feature vector of the $i^{th}$ context word; $x_{i:i+\theta-1}$ indicates a vector that is obtained by concatenating the feature vectors of the $i^{th}$ to the $i+\theta-1^{th}$ context words; $y_i$ indicates the $i^{th}$ element in the vector that is obtained through the convolutional calculation; ω indicates weight parameters of the convolutional layer; ζ indicates offset parameters of the convolutional layer; σ indicates an activation function; max indicates a maximum value function; average indicates an average value function; c(j) indicates the $j^{th}$ element in the first vector that is obtained through pooling calculation; t indicates the number of context words; c indicates the first vector; w indicates the second vector; $w_m'$ indicates the third vector corresponding to the $m^{th}$ negative sample word; ω indicates weight parameters of the convolutional layer; ζ indicates offset parameters of the convolutional layer; ς indicates weight parameters of the full connection layer; τ indicates offset parameters of the full connection layer; γ indicates a hyperparameter; s indicates a similarity calculation function; and λ indicates the number of negative sample words; and Act 6: inputting the feature vector of each obtained word into the full connection layer of the trained convolutional neural network for calculation to obtain corresponding word vectors.

22. An apparatus for generating word vectors, comprising:
at least one processor, and
a memory communicatively connected to the at least one processor, the memory storing instructions that are executed by the at least one processor to cause the at least one processor to implement:
  an acquisition module, configured to obtain words by segmenting a corpus;
  an establishment module, configured to establish a feature vector for each obtained word based, at least in part, on one or more n-ary characters corresponding to the obtained word, wherein each n-ary character indicates n consecutive characters of a word;
  a training module, configured to train a convolutional neural network based, at least in part, on the feature vectors of the obtained words and the feature vectors of context words associated with each obtained word in the corpus by:
    traversing the corpus after word segmentation, and performing the following actions responsive to a current word being accessed during the traversal:
      determining one or more context words and one or more negative sample words associated with the current word in the corpus;
      inputting feature vectors of the context words associated with the current word into a convolutional layer of the convolutional neural network for convolutional calculation;
      inputting a result of the convolutional calculation into a pooling layer of the convolutional neural network for pooling calculation to obtain a first vector;
      inputting a feature vector of the current word into a full connection layer of the convolutional neural network for calculation to obtain a second vector; and
      inputting a feature vector of a negative sample word associated with the current word into the full connection layer of the convolutional neural network for calculation to obtain a third vector; and
    updating parameters of the convolutional neural network based, at least in part, on the first vector, the second vector, the third vector, and a specified loss function; and
  a generation module, configured to generate a word vector for each obtained word based on the feature vector of the obtained word and the trained convolutional neural network.

* * * * *

UNITED STATES PATENT AND TRADEMARK OFFICE
CERTIFICATE OF CORRECTION

PATENT NO. : 11,030,411 B2
APPLICATION NO. : 16/883184
DATED : June 8, 2021
INVENTOR(S) : Shaosheng Cao et al.

It is certified that error appears in the above-identified patent and that said Letters Patent is hereby corrected as shown below:

In the Claims

Column 19, Claim 16, Lines 53-56:

" $\tilde{x}_i = x_{i:i+\theta-1} = \left[x_i^T, x_{i+1}{}^T, \ldots, x_{i+\theta-1}{}^T\right]^T$ " should read, -- $\tilde{x}_i = x_{i:i+\theta-1} = \left[x_i^T, x_{i+1}^T, \ldots, x_{i+\theta-1}^T\right]^T$ --

Column 21, Claim 21, Lines 20-23:

" $\tilde{x}_i = x_{i:i+\theta-1} = \left[x_i^T, x_{i+1}{}^T, \ldots, x_{i+\theta-1}{}^T\right]^T$ " should read, -- $\tilde{x}_i = x_{i:i+\theta-1} = \left[x_i^T, x_{i+1}^T, \ldots, x_{i+\theta-1}^T\right]^T$ --

Signed and Sealed this
Seventh Day of June, 2022

Katherine Kelly Vidal
*Director of the United States Patent and Trademark Office*